United States Patent
Nakajima (10) Patent No.: US 11,648,804 B2
(45) Date of Patent: May 16, 2023

(54) TIRE

(71) Applicant: Sumitomo Rubber Industries, Ltd., Kobe (JP)

(72) Inventor: Koichi Nakajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/476,505

(22) Filed: Sep. 16, 2021

(65) Prior Publication Data

US 2022/0080778 A1 Mar. 17, 2022

(30) Foreign Application Priority Data

Sep. 17, 2020 (JP) .............................. JP2020-156670

(51) Int. Cl.
*B60C 11/11* (2006.01)
*B60C 11/03* (2006.01)

(52) U.S. Cl.
CPC ........... *B60C 11/11* (2013.01); *B60C 11/0309* (2013.01)

(58) Field of Classification Search
CPC . B60C 11/11; B60C 11/0306; B60C 11/0309; B60C 11/1392; B60C 2011/133; B60C 11/1307; B60C 2011/1338; B60C 11/1376; B60C 11/1384; B60C 11/1315
See application file for complete search history.

(56) References Cited

U.S. PATENT DOCUMENTS

| | | | | |
|---|---|---|---|---|
| 5,031,680 A | * | 7/1991 | Kajikawa | B60C 11/033 152/902 |
| 2001/0032691 A1 | * | 10/2001 | Ohsawa | B60C 11/13 152/209.18 |

FOREIGN PATENT DOCUMENTS

JP 9-136515 A 5/1997

* cited by examiner

*Primary Examiner* — Katelyn W Smith
*Assistant Examiner* — Brendon Charles Darby
(74) *Attorney, Agent, or Firm* — Xsensus LLP (57) ABSTRACT

A tire can include a block having a recess. The recess can include a first opening on a tread side and a second opening on a side wall face side. The first opening can include a pair of first edges extending from a first vertex to the side wall face side so as to form a V-shaped edge on the tread. The second opening can include a pair of second edges that can extend from a second vertex on the side wall face, and can be connected to the pair of first edges at intersection points. One of the pair of second edges can include a second edge body that can extend on a straight line from the second vertex to the intersection point, and a second edge subsidiary portion that can be bent so as to widen the second opening.

20 Claims, 11 Drawing Sheets

TIRE

CROSS-REFERENCE TO RELATED APPLICATION

The present application claims priority to Japanese patent application JP 2020-156670, filed on Sep. 17, 2020, the entire contents of which are incorporated herein by reference in its entirety.

BACKGROUND

Field

The present disclosure relates to a tire.

Description of the Background Art

Japanese Laid-Open Patent Publication No. H9-136515 describes a pneumatic tire, for ice and snow roads, having groove walls of groove portions. The groove walls of the groove portions have cut portions formed in a zigzag shape at a tread surface. Such a pneumatic tire may allow prevention of snow clogging and may exhibit certain on-ice performance and/or on-snow performance.

In recent years, in urban areas in snowy regions, snow is often compressed on a road surface to generate a packed-snow road. On such a packed-snow road, snow is unlikely to enter grooves of a tire, and snow columns may be difficult to form, so that snow road performance is likely to deteriorate.

The present disclosure and embodiments thereof have been made in view of the aforementioned circumstances, and an object of one or more embodiments of the present disclosure, among other objects, is to provide a tire that can enhance snow road performance on packed-snow roads.

SUMMARY

The present disclosure is directed to a tire including a tread portion. The tread portion can include at least one block. The block can include a tread, and side wall faces extending inwardly from the tread in a tire radial direction. The block can have a recess. The recess can include a first opening on the tread side and a second opening on the side wall face side. The first opening can include a pair of first edges extending from a first vertex to the side wall face side so as to form a V-shaped edge on the tread. The second opening can include a pair of second edges that extend from a second vertex on a corresponding one of the side wall faces, and can be connected to the pair of first edges at intersection points. At least one of the pair of second edges can include a second edge body that can extend on a straight line from the second vertex to a corresponding one of the intersection points, and a second edge subsidiary portion that can be bent so as to widen the second opening.

In the tire according to one or more embodiments of the present disclosure, an angle, of a line segment connecting the first vertex and the second vertex to each other, relative to the tread can be 30 to 50°.

In the tire according to one or more embodiments of the present disclosure, the second edge subsidiary portion can include a first portion extending at an angle of not greater than 10° relative to the tread.

In the tire according to one or more embodiments of the present disclosure, a width of the first portion can be 0.20 to 0.30 times a maximum width of the recess.

In the tire according to one or more embodiments of the present disclosure, a maximum depth of the recess can be 0.2 to 0.5 times a block height.

In the tire according to one or more embodiments of the present disclosure, the side wall faces can extend in a tire axial direction.

In the tire according to one or more embodiments of the present disclosure, the side wall faces can be separated from each other via the tread so as to be located on both sides of the block. The recess can be disposed at each of the side wall faces separated from each other.

In the tire according to one or more embodiments of the present disclosure, a length of at least one of the pair of first edges and the pair of second edges can be 2 to 4 mm.

In the tire according to one or more embodiments of the present disclosure, the recess can include a pair of inclined faces each passing through the first vertex, the second vertex, and one of the intersection points, and a grooved portion that can be disposed at at least one of the pair of inclined faces and can be recessed inwardly in the block.

In the tire according to one or more embodiments of the present disclosure, the grooved portion can have a width that gradually increases from the first vertex toward a corresponding one of the second edges.

In the tire according to one or more embodiments of the present disclosure, the grooved portion can extend to the second edge subsidiary portion.

In the tire according to one or more embodiments of the present disclosure, the angle of the first portion of the second edge subsidiary portion relative to the tread can be almost 0° (e.g., +/−1°).

In the tire according to one or more embodiments of the present disclosure, the second edge subsidiary portion can include a first portion extending at such an angle as to be substantially parallel to the tread.

Embodiments of the present disclosure can have the above-described configuration(s) and thus can enhance snow road performance on packed-snow roads.

DETAILED DESCRIPTION

One embodiment of the present disclosure will be described below with reference to the drawings.

Figure 1:
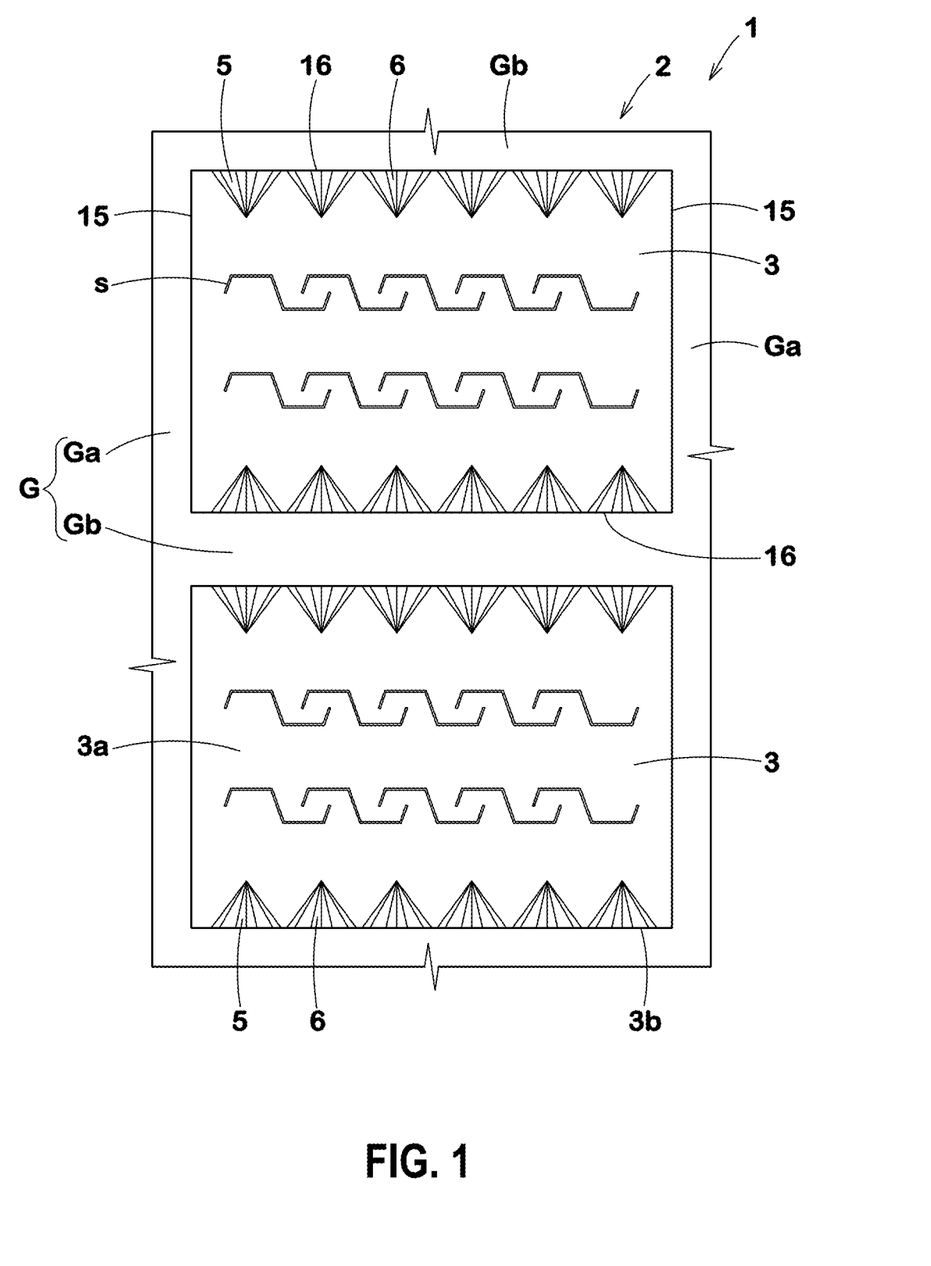
FIG. 1 is an enlarged plan view of a tread portion of a tire according to one embodiment of the present disclosure.
Figure 2:
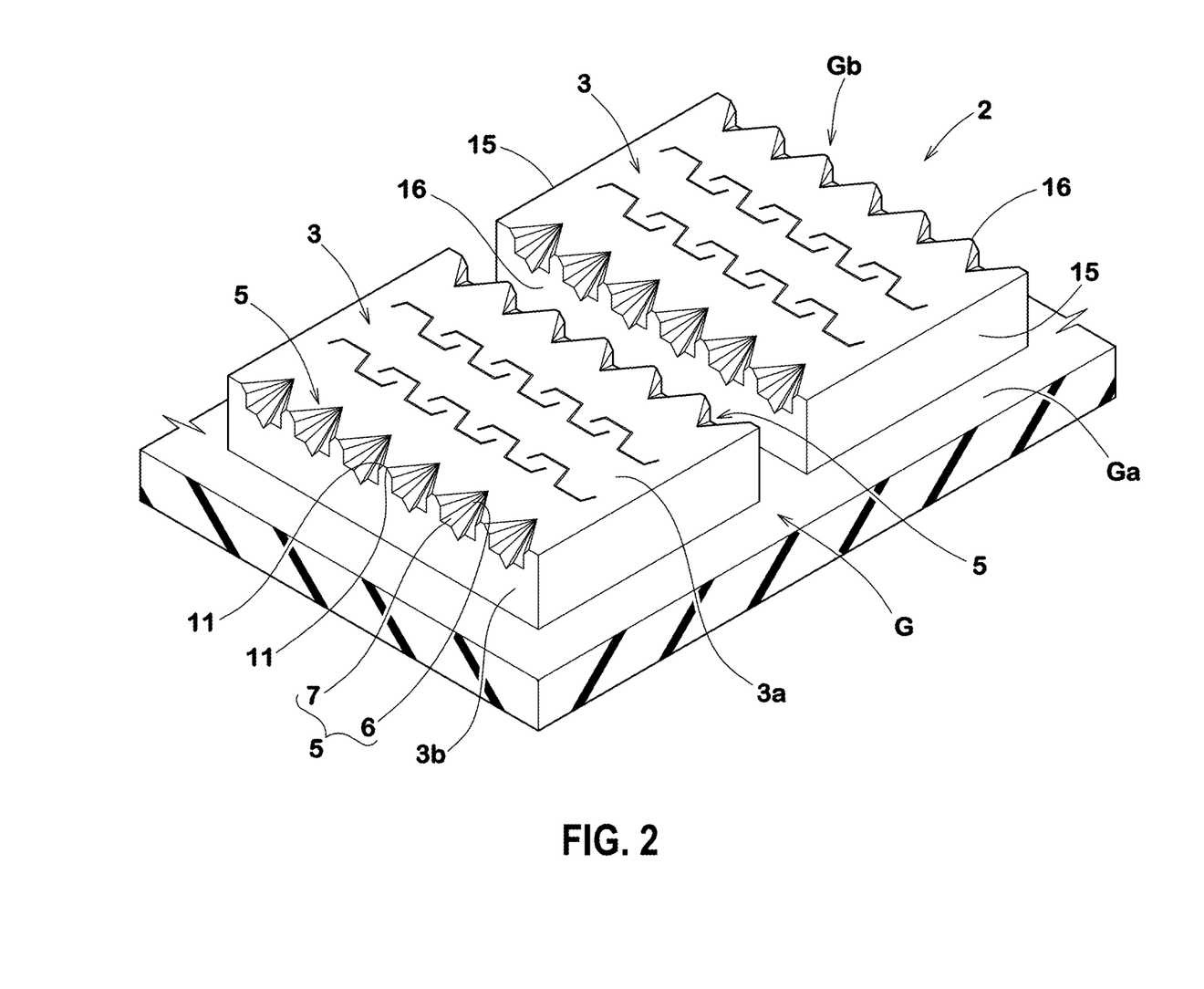
FIG. 2 is a perspective view of the tread portion shown in FIG. 1.

FIG. 1 is an enlarged plan view of a tread portion 2 of a tire 1 according to the present embodiment. FIG. 2 is a perspective view of the tread portion 2 shown in FIG. 1. The tire 1 of the present embodiment can be used as a pneumatic tire, for passenger cars, for instance, which can be suitable for running on, for example, a snow road, in particular, a packed-snow road. Embodiments of the present disclosure may be adopted for a heavy duty pneumatic tire and also for a non-pneumatic tire the inside of which is not inflated with pressurized air.

As shown in FIG. 1 and FIG. 2, in the present embodiment, the tread portion 2 can include at least one block 3 (FIG. 1 and FIG. 2 show two blocks 3, though embodiments of the disclosed subject matter are not so limited).

In the present embodiment, the block 3 can include a tread 3a and a side wall face 3b extending from the tread 3a in a radially inward direction of the tire. The tread 3a can be referred to or characterized as a region that comes into contact with a road surface during running of the tire 1. The tread 3a can have, for example, sipes s, such as shown in FIG. 1, that can allow enhancement of running performance on an ice road. In the present embodiment, the side wall face 3b can be formed by a groove G that may define the block 3.

In the present embodiment, the block 3 can have a recess 5. The recess 5 can include a first opening 6 on the tread 3a side, and a second opening 7 on the side wall face 3b side. Thus, in the present embodiment, the recess 5 can allow the block 3 to be recessed over the tread 3a and the side wall face 3b, whereby snow columns can be formed on a snow road.

Figure 3:
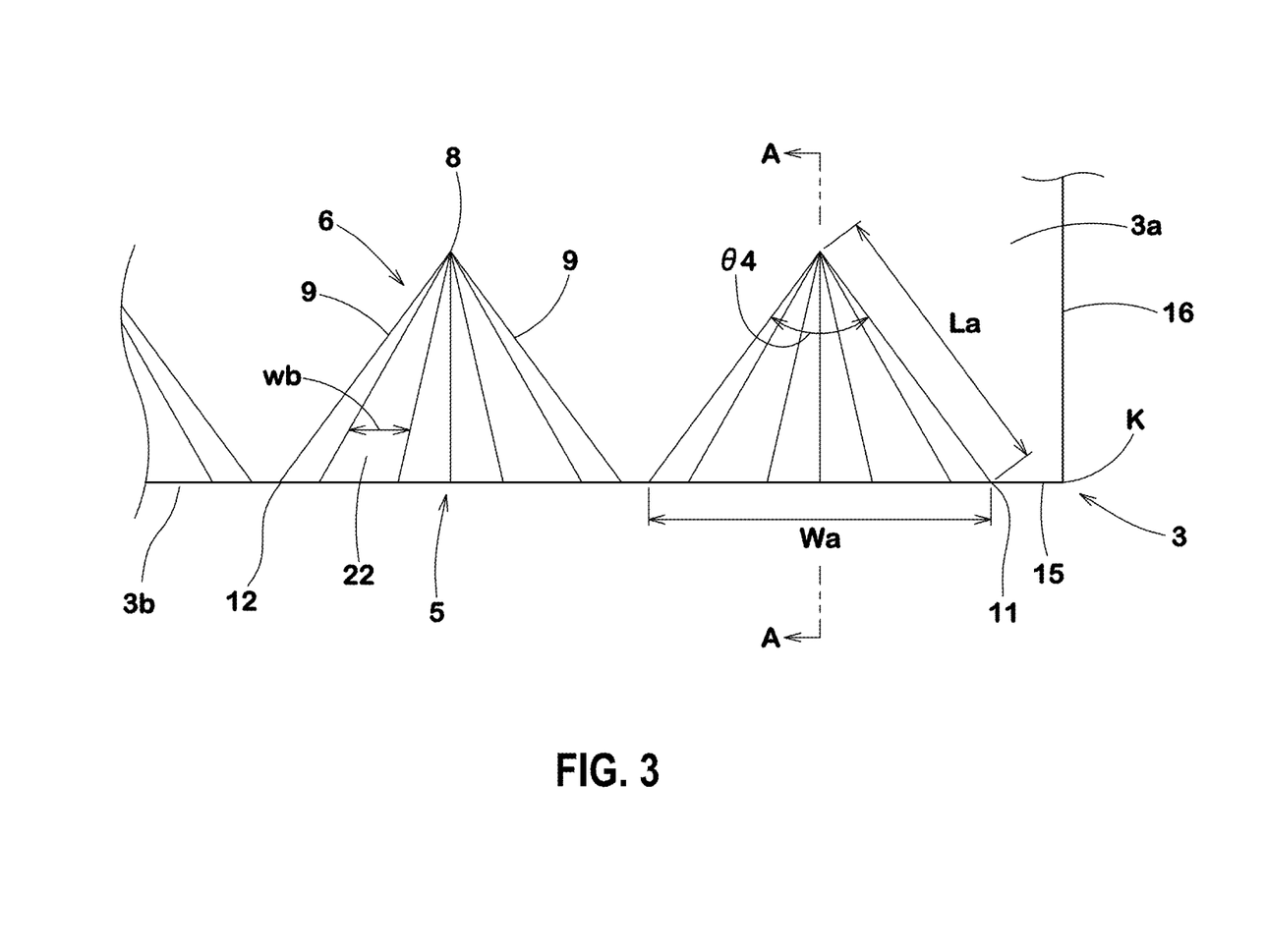
FIG. 3 is an enlarged partial side view of a block shown in FIG. 1.

FIG. 3 is an enlarged view of FIG. 1. As shown in FIG. 3, the first opening 6 can include a pair of first edges 9 extending from a first vertex 8 to the side wall face 3b side so as to form a V-shaped edge on the tread 3a. The first opening 6 having such a structure can exert a relatively high shearing force with respect to a packed-snow road. Furthermore, an ice road surface can be scratched by the first opening 6, which can enhance ice road performance.

Figure 4:
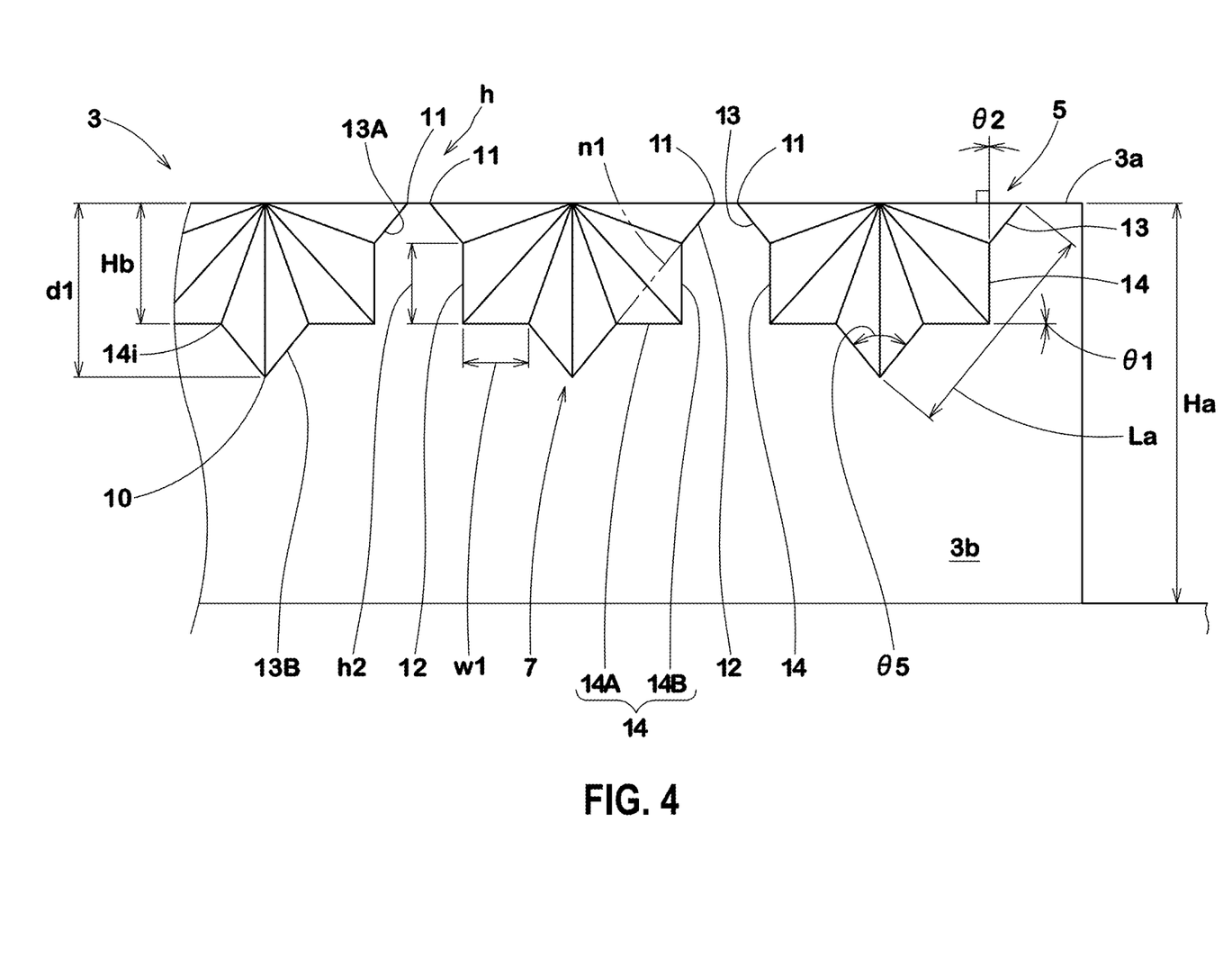
FIG. 4 is an enlarged side view of the block shown in FIG. 1.

FIG. 4 illustrates the recess 5 as viewed from the side wall face 3b side. As shown in FIG. 4, the second opening 7 can include a pair of second edges 12, which can extend from a second vertex 10 on the side wall face 3b and connect to the pair of first edges 9 at intersection points 11. Each second edge 12 can include a second edge body 13, which can extend from the second vertex 10 on a straight line that reaches the intersection point 11, and a second edge subsidiary portion 14 that can be bent so as to widen the second opening 7. The second edge subsidiary portion 14 having such a structure can allow a relatively large snow column to be formed also on a packed-snow road. Therefore, the tire 1 of the present embodiment can exhibit excellent snow road performance on a packed-snow road.

As shown in FIG. 3 and FIG. 4, in the present embodiment, the pair of second edges 12 each can include the second edge body 13 and the second edge subsidiary portion 14. Therefore, the above-described effect can be more effectively exhibited.

As shown in FIG. 1 and FIG. 2, a plurality (e.g., two in FIG. 1) of the blocks 3 can be aligned in, for example, a tire circumferential direction. In the present embodiment, the block 3 can be formed in a rectangular shape in a planar view of the tread portion 2. However, the shape of the block 3 is not limited to such a shape, and various shapes can be adopted.

The groove G can include, for example, longitudinal grooves Ga, which can extend in the tire circumferential direction, and transverse grooves Gb, which can extend in the tire axial direction. In the present embodiment, the block 3 can be defined by a pair of the longitudinal grooves Ga and a pair of the transverse grooves Gb. In the description herein, "extending in the tire circumferential direction" can represent extending at an angle of not greater than 45° relative to the tire circumferential direction. Meanwhile, "extending in the tire axial direction" can represent extending at an angle of greater than 45° relative to the tire circumferential direction.

The side wall face 3b can be divided into a pair of first side wall faces 15, which can be parallel with each other and face the pair of the longitudinal grooves Ga, and a pair of second side wall faces 16, which can be parallel with each other and face the pair of the transverse grooves Gb. In the present embodiment, the pair of first side wall faces 15 can be separated from each other via the tread 3a so as to be located on opposite sides of the block 3 in the tire axial direction. In the present embodiment, the pair of second side wall faces 16 can be separated from each other via the tread 3a so as to be located on opposite sides of the block 3 in the tire circumferential direction.

In the block 3 of the present embodiment, the second opening 7 of the recess 5 can be disposed at the second side wall face 16. Thus, the recess 5 (e.g., including the first opening 6) can allow a relatively high snow column shearing force to be imparted during braking and/or driving. The second openings 7 of the recess 5 can be formed at, for example, the pair of the second side wall faces 16, respectively, formed in the block 3. Thus, a relatively high snow column shearing force can be imparted during braking and/or driving, thereby further enhancing snow road performance on a packed-snow road.

Figure 5:
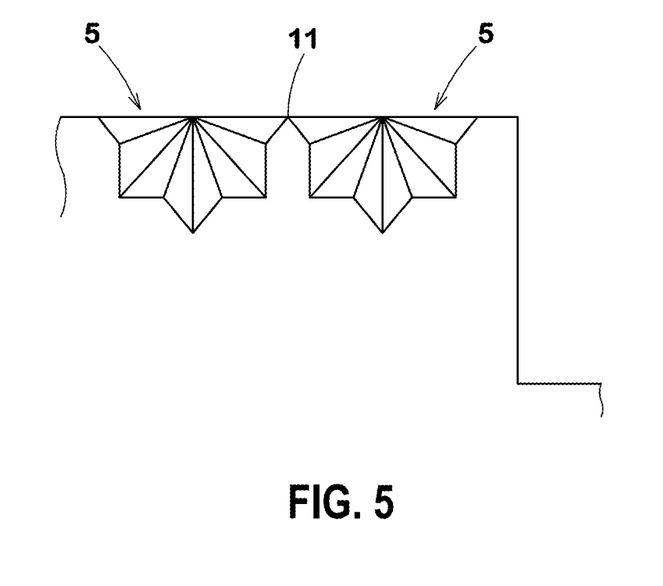
FIG. 5 is a side view of another embodiment of the tread portion shown in FIG. 4.

In the present embodiment, a plurality of the recesses 5 can be formed in one side wall face 3b. The recesses 5 can be disposed, for example, along the longitudinal direction of the side wall face 3b. The recesses 5 can be disposed such that, for example, a gap h (shown in FIG. 4) can be formed between the intersection points 11 and 11 of the recesses 5 adjacent to each other. The recess 5 is not limited thereto. For example, the recesses 5 adjacent to each other may be disposed so as to share the intersection point 11 (shown in FIG. 5).

As shown in FIG. 3 and FIG. 4, the second edge body 13 can include an outer portion 13A, which can extend inwardly from the intersection point 11 in the tire radial direction, and an inner portion 13B, which can extend outwardly from the second vertex 10 in the tire radial direction. The second edge subsidiary portion 14 can be disposed, for example, between the outer portion 13A and the inner portion 13B. The second edge subsidiary portion 14 having such a structure can allow snow columns to be more easily formed on a packed-snow road on which snow may otherwise be unlikely to enter the recess 5, which can enhance snow road performance. The outer portion 13A and the inner portion 13B can be disposed so as to form, for example, one straight line n1 (see, e.g., FIG. 4).

The second edge subsidiary portion 14 can include a first portion 14A, which can extend at an angle θ1 of not greater than 10° relative to the tread 3a, for instance. It can also be said that the first portion 14A can be substantially parallel to the tread 3a. The first portion 14A having such a structure can contribute to forming of a relatively firm snow column on a packed-snow road. In the present embodiment, the first portion 14A can be connected to the inner portion 13B.

The second edge subsidiary portion 14 can include a second portion 14B, which can be connected to the first portion 14A, and which can extend at an angle θ2 of not greater than 10° relative to the direction normal to the tread 3a, for instance. The second portion 14B having such a structure can inhibit reduction of stiffness of the block 3, and can enhance snow road performance, and/or steering stability and wear resistance on a dry road while increasing a volume of a snow column. In the present embodiment, the second portion 14B can be connected to the outer portion 13A and the first portion 14A.

A width w1 of the first portion 14A can be 0.20 to 0.30 times a maximum width Wa of the recess 5. In a case where the width w1 of the first portion 14A is not less than 0.20 times the maximum width Wa of the recess 5, a relatively large snow column may be formed. In a case where the width w1 of the first portion 14A is not greater than 0.30 times the maximum width Wa of the recess 5, reduction of stiffness of the block 3 may be inhibited, and steering stability on a dry road can be maintained to be high. From these viewpoints, the width w1 of the first portion 14A can be not less than 0.23 times the maximum width Wa of the recess 5, and moreover, optionally not greater than 0.27 times the maximum width Wa.

A maximum depth d1 of the recess 5 can be 0.2 to 0.5 times a block height Ha. In a case where the maximum depth d1 of the recess 5 is not less than 0.2 times the block height Ha, a snow column shearing force can be enhanced. In a case where the maximum depth d1 of the recess 5 is not greater than 0.5 times the block height Ha, steering stability on a dry road can be maintained to be relatively high. From these viewpoints, the maximum depth d1 of the recess 5 can be not less than 0.3 times the block height Ha and, moreover, optionally not greater than 0.4 times the block height Ha.

A distance Hb in the tire radial direction between the intersection point 11 and an inner end 14i of the second edge subsidiary portion 14 in the tire radial direction can be not less than 0.50 times the maximum depth d1 of the recess 5, for instance, not less than 0.55 times the maximum depth d1, and, moreover, optionally not greater than 0.75 times the maximum depth d1, for instance, not greater than 0.70 times the maximum depth d1. Thus, while reduction of steering stability on a dry road can be inhibited, snow road performance on a packed-snow road can be enhanced.

In order to more effectively exhibit the above-described effect, a height h2 of the second edge subsidiary portion 14 in the tire radial direction can be not less than 0.30 times the maximum depth d1 of the recess 5, for instance, not less than 0.35 times the maximum depth d1, and, moreover, optionally not greater than 0.55 times the maximum depth d1, for instance, not greater than 0.50 times the maximum depth d1.

A length La of at least one of the pair of first edges 9 and/or the pair of second edges 12 can be 2 to 4 mm, for instance. In a case where the length La is not less than 2 mm, a large snow column can be formed. In a case where the length La is not greater than 4 mm, reduction of stiffness of the block 3 can be inhibited. In the present embodiment, all of the pair of first edges 9 and the pair of second edges 12 can be formed so as to have the length La of 2 to 4 mm, for instance.

In the description herein, unless otherwise specified, dimensions and the like of components of the tire 1 are represented as values measured in a normal state. The "normal state" can represent a state in which the tire 1 as a pneumatic tire is mounted on a normal rim and is inflated to a normal internal pressure, and no load is applied to the tire 1.

The "normal rim" can represent a rim that is defined by a standard, in a standard system including the standard on which the tire is based, for each tire, and can be, for example, the "standard rim" in the JATMA standard, the "Design Rim" in the TRA standard, or the "Measuring Rim" in the ETRTO standard.

The "normal internal pressure" can represent an air pressure that is defined by a standard, in a standard system including the standard on which the tire is based, for each tire, and can be the "maximum air pressure" in the JATMA standard, the maximum value recited in the table "TIRE LOAD LIMITS AT VARIOUS COLD INFLATION PRESSURES" in the TRA standard, or the "INFLATION PRESSURE" in the ETRTO standard.

When the tread portion 2 is viewed in a planer view, an angle θ4 between the paired first edges 9 around the first vertex 8 can be not less than 70°, for instance, not less than 75°, and, moreover, optionally not greater than 90°, for instance, not greater than 85°.

Similarly, an angle θ5 between the paired second edges 12 (second edge bodies 13) around the second vertex 10 can be not less than 70°, for instance, not less than 75°, and, moreover, optionally not greater than 90°, for instance, not greater than 85°.

Figure 6:
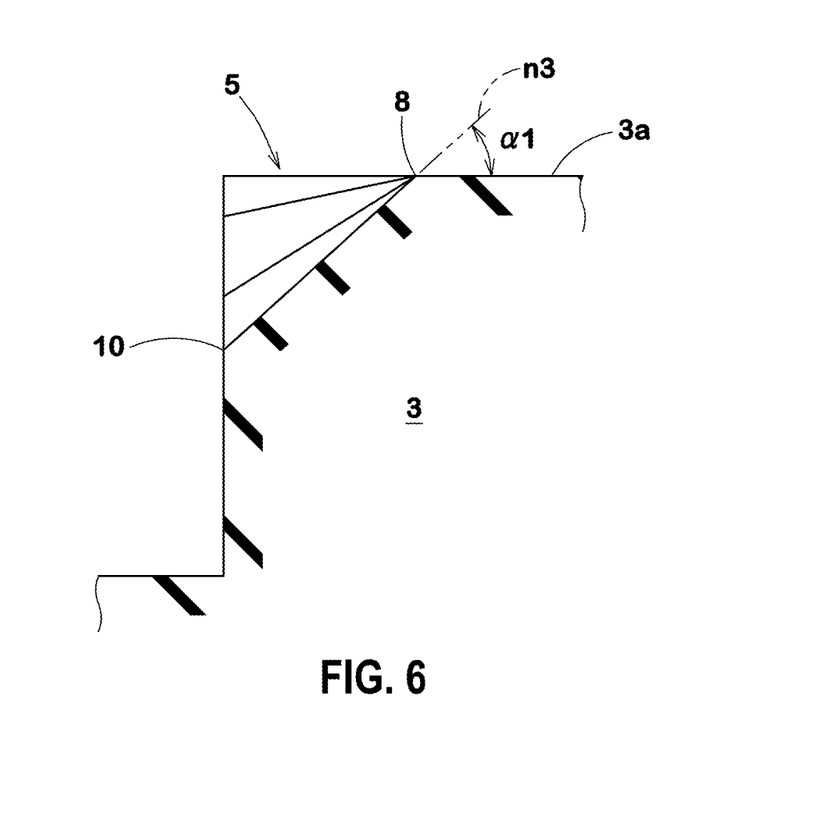
FIG. 6 is a cross-sectional view taken along a line A-A in FIG. 3.

FIG. 6 is a cross-sectional view taken along a line A-A in FIG. 3. As shown in FIG. 6, an angle α1, of a line segment n3 connecting the first vertex 8 and the second vertex 10 to each other, relative to the tread 3a can be 30 to 50°. In a case where the angle α1 is not less than 30°, a volume of a snow column to be trodden can be ensured. In a case where the angle α1 is not greater than 50°, snow can be firmly trodden. In order to effectively exhibit such an effect, the angle α1 can be not less than 35°, for instance, not less than 40°.

Figure 7:
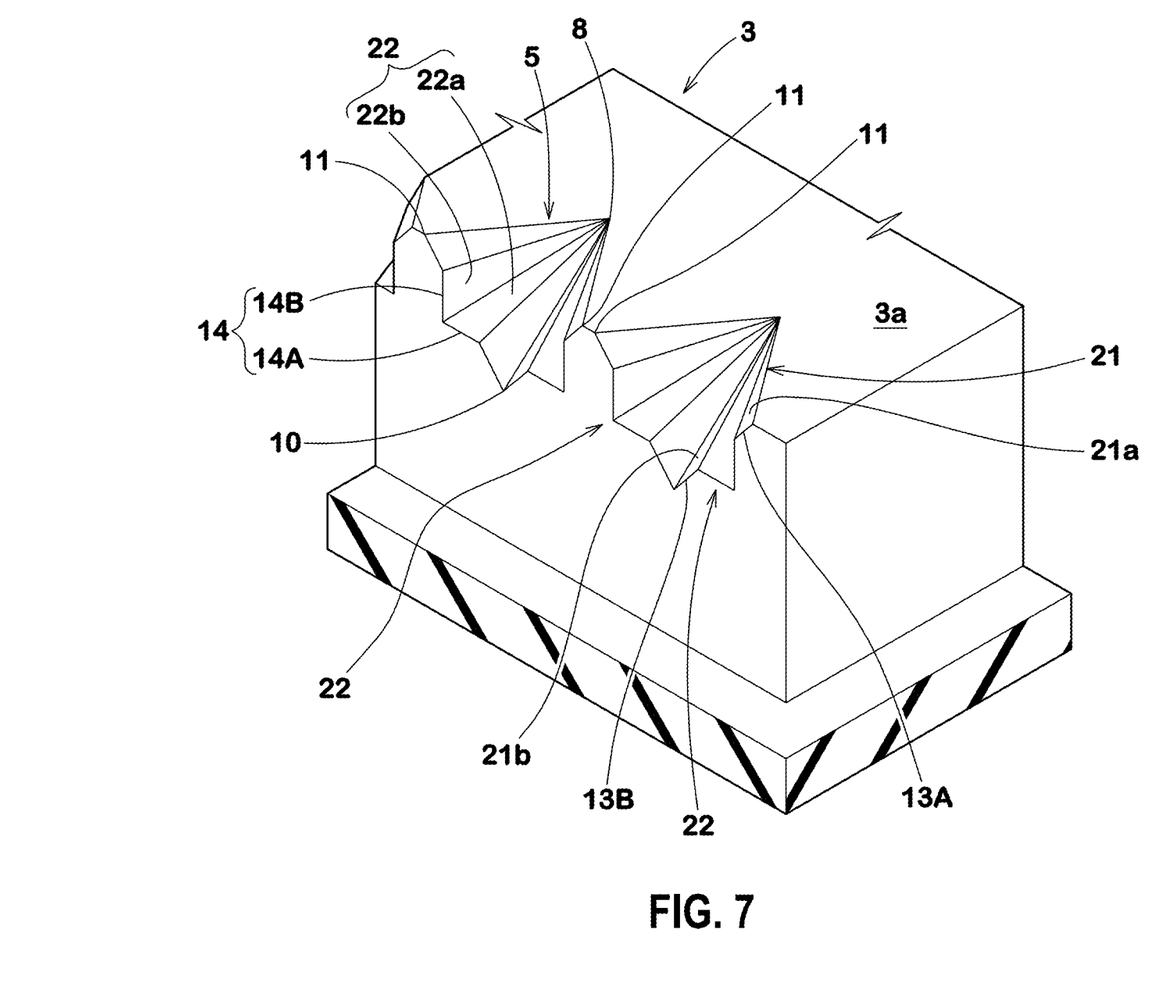
FIG. 7 is an enlarged partial view of the tread block shown in FIG. 2.

FIG. 7 is an enlarged view of FIG. 2. As shown in FIG. 7, the recess 5 can include a pair of inclined faces 21, wherein each inclined face 21 can pass through the first vertex 8, the second vertex 10, and one intersection point 11, and a grooved portion 22 that can be disposed at at least one of the paired inclined faces 21 and recessed inwardly in the block 3. In the present embodiment, each of the paired inclined faces 21 can include the grooved portion 22.

In the present embodiment, each inclined face 21 can include a first inclined face 21a, which can extend from the first vertex 8 to the outer portion 13A side, and a second inclined face 21b, which can extend from the first vertex 8 to the inner portion 13B side. In the present embodiment, the first inclined face 21a and the second inclined face 21b can be formed on the same plane. The inclined faces 21 having such a structure can inhibit reduction of stiffness of the block 3. The first inclined face 21a can be connected to, for example, the outer portion 13A. The second inclined face 21b can be connected to, for example, the inner portion 13B.

The grooved portion 22 can extend to, for example, the second edge subsidiary portion 14. In the present embodiment, the grooved portion 22 can include an outward-facing surface 22a, which can extend from the first vertex 8 to the first portion 14A side of the second edge subsidiary portion 14, and an inward-facing surface 22b, which can extend from the first vertex 8 to the second portion 14B side of the second edge subsidiary portion 14. The outward-facing surface 22a can be connected to, for example, the first portion 14A. In the present embodiment, the outward-facing surface 22a can face toward the tread 3a. The inward-facing surface 22b can be connected to, for example, the second portion 14B. In the present embodiment, the inward-facing surface 22b can face toward the inside of the recess 5. The outward-facing surface 22a having such a structure can contribute to forming of a relatively firm snow column. The inward-facing surface 22b can allow a relatively high shearing force to be exerted with respect to a snow column.

As shown in FIG. 3, in the present embodiment, the grooved portion 22 can have a width wb that gradually increases from the first vertex 8 toward the second edge 12. The grooved portion 22 having such a structure can allow snow entering the recess 5 from the second opening 7 to be compressed at the inclined face 21, and, simultaneously, the snow can be further compressed, since a volume of the recess 5 gradually decreases toward the first vertex 8. The grooved portion 22 can contribute to discharging of snow accumulated in the recess 5 smoothly into the groove G.

In the present embodiment, the recess 5 can be separated from an intersection portion K at which the first side wall face 15 and the second side wall face 16 intersect each other. In other words, the intersection point 11 of the recess 5 and the intersection portion K can be separated from each other. Thus, the stiffness of the block 3 can be maintained to be relatively high.

Figure 8:
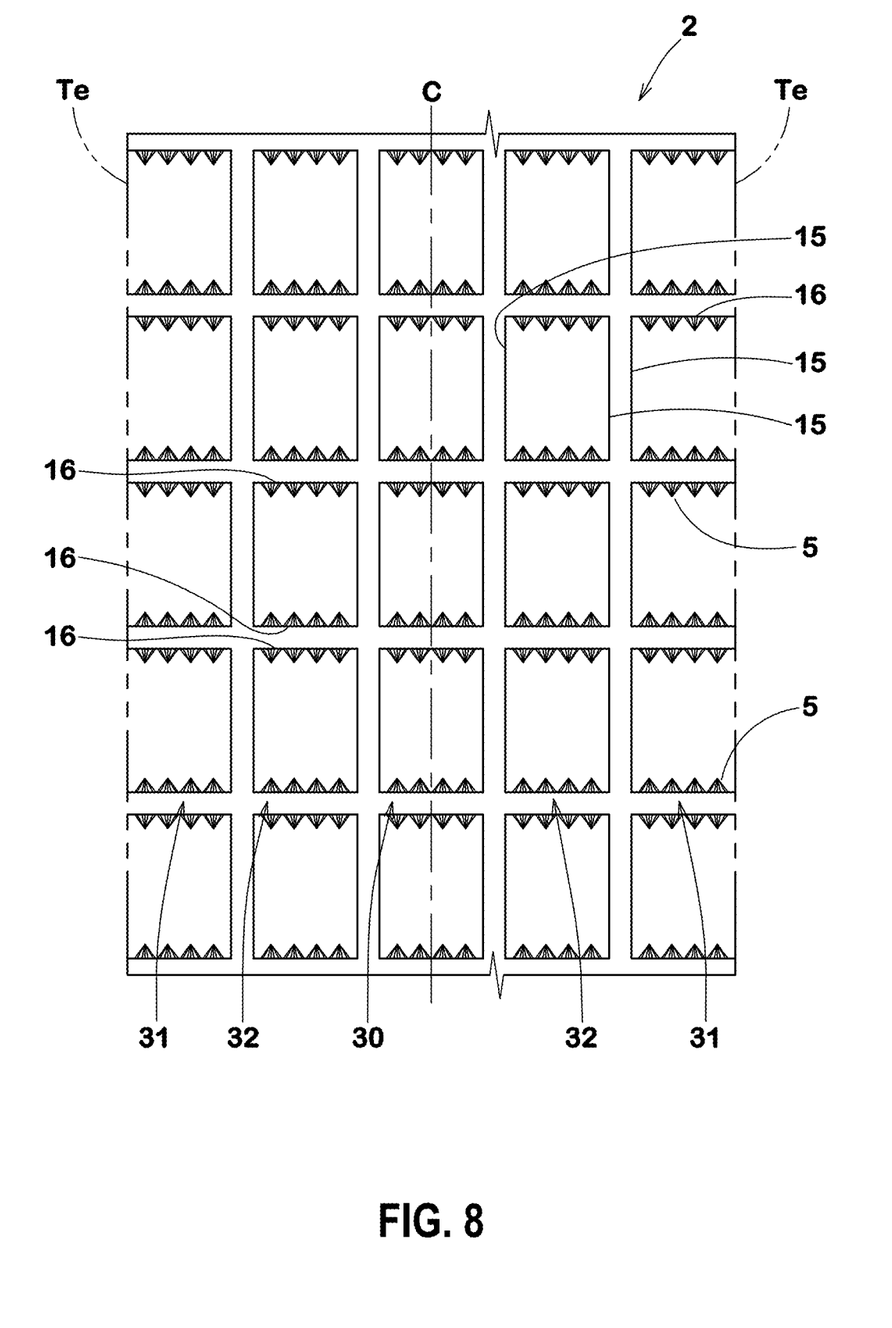
FIG. 8 is a plan view of a tread portion according to one embodiment.

FIG. 8 is a plan view illustrating development of the tread portion 2 between tread ends Te. As shown in FIG. 8, in the present embodiment, the tread portion 2 can have a crown block 30 on a tire equator C, shoulder blocks 31 passing through the tread ends Te, and middle blocks 32 disposed between the crown block 30 and the shoulder blocks 31.

In the present embodiment, the recesses 5 can be disposed at the second side wall faces 16 of each of the blocks 30 to 32. Thus, a relatively high snow column shearing force can be exerted during braking and/or driving, which can enhance snow road performance.

The "tread end Te" can represent a ground contact position on the outermost side in the tire axial direction in a case where a normal load is applied to the tire 1 as a pneumatic tire in the normal state and the tire 1 is brought into contact with a plane at a camber angle of 0°.

The "normal load" can represent a load that can be defined by a standard, in a standard system including the standard on which the tire is based, for each tire, and can be the "maximum load capacity" in the JATMA standard, the maximum value recited in the table "TIRE LOAD LIMITS AT VARIOUS COLD INFLATION PRESSURES" in the TRA standard, or the "LOAD CAPACITY" in the ETRTO standard.

Figure 9:
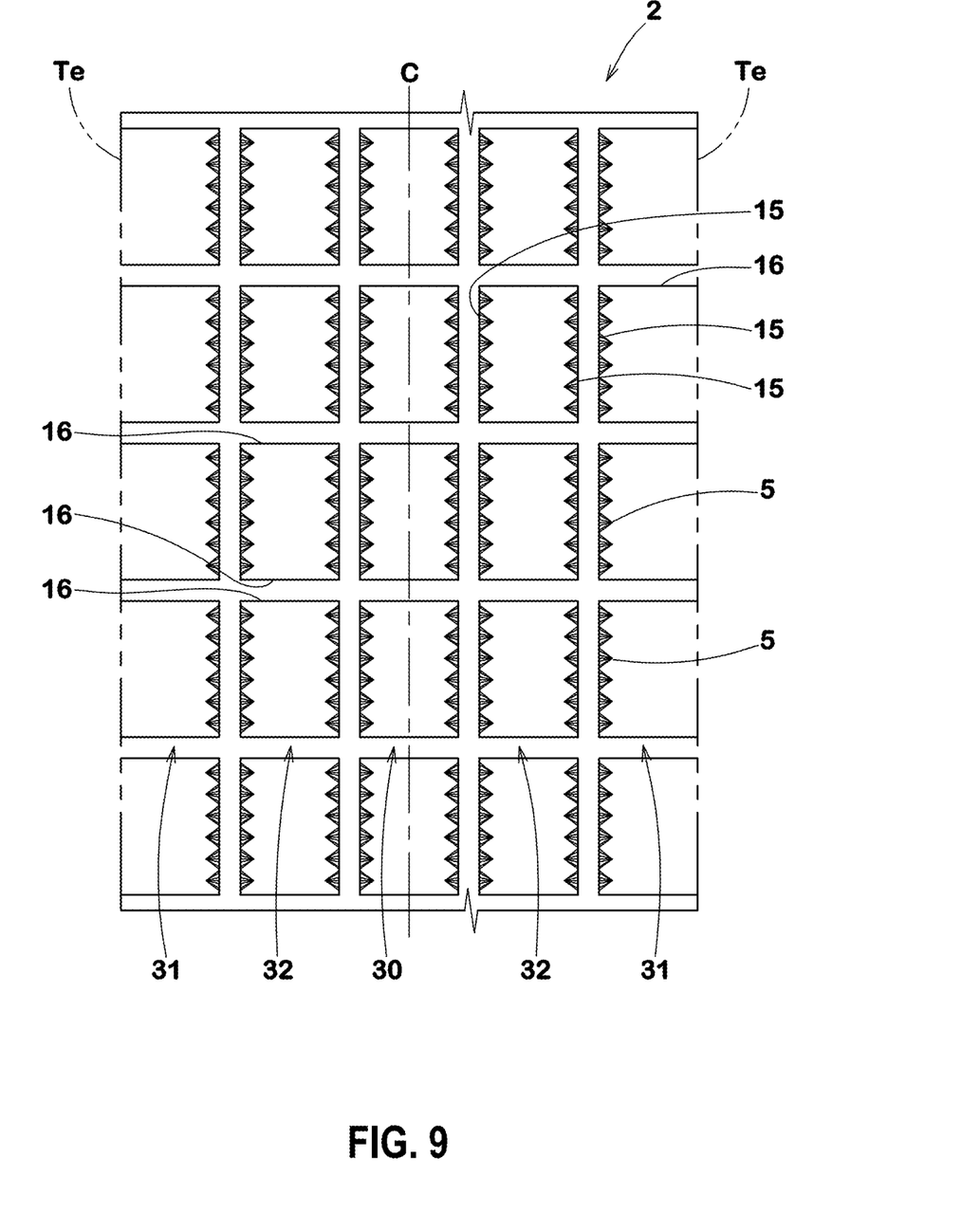
FIG. 9 is a plan view of a tread portion according to another embodiment.

FIG. 9 is a plan view illustrating development of the tread portion 2 of another embodiment between the tread ends Te. The same components as shown in FIG. 8 are denoted by the same reference characters, and the description thereof is omitted. As shown in FIG. 9, in the present embodiment, the recesses 5 can be disposed at the first side wall faces 15 of each of the blocks 30 to 32. That is, in this mode, the recess 5 can be disposed at the first side wall face 15 on which a relatively low load can act during braking and/or driving, which can inhibit each of the blocks 30 to 32 from, for example, becoming defective and/or worn.

Figure 10:
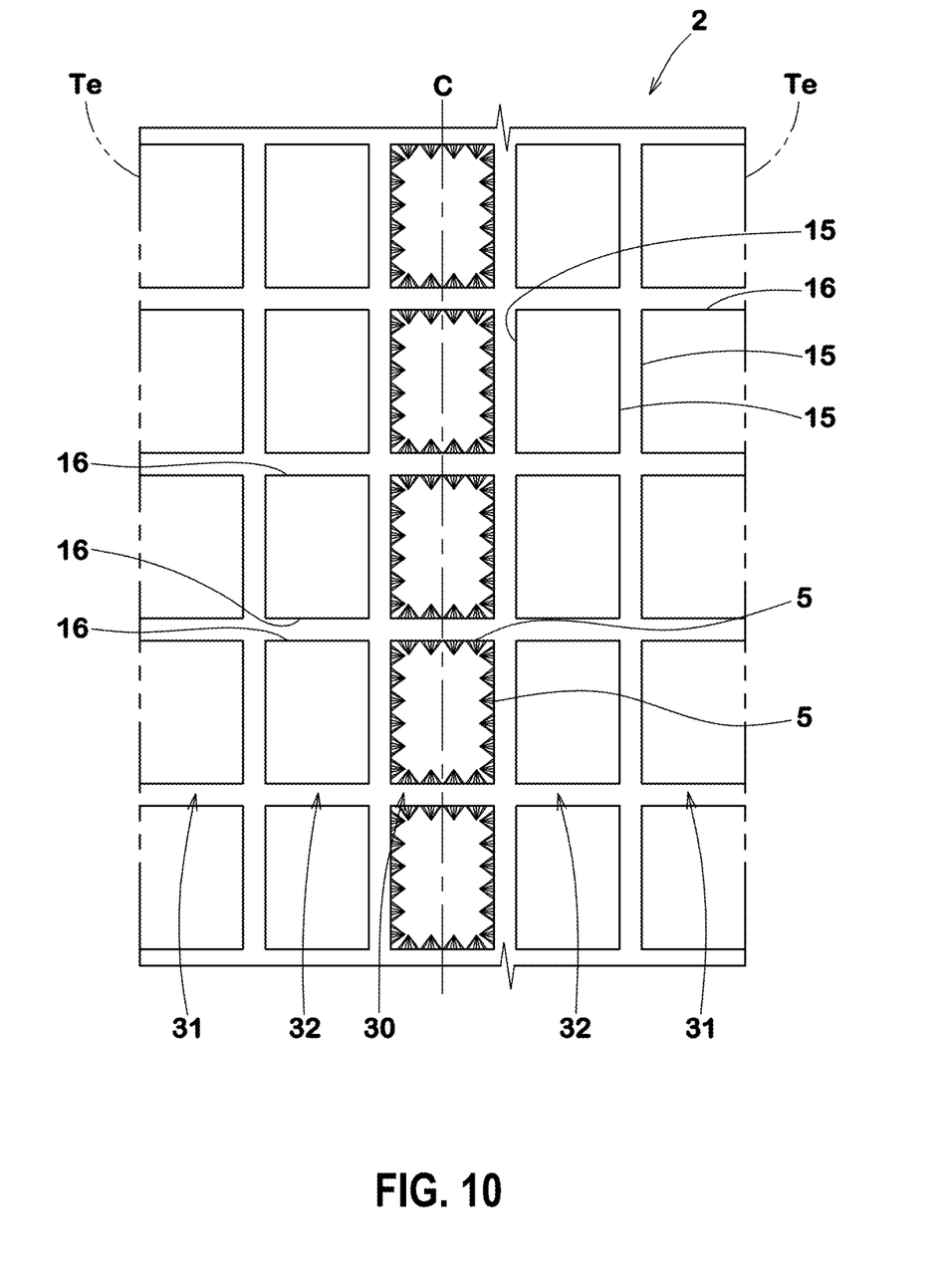
FIG. 10 is a plan view of a tread portion according to still another embodiment.

FIG. 10 is a plan view illustrating development of the tread portion 2 of another embodiment between the tread ends Te. The same components as shown in FIG. 8 are denoted by the same reference characters, and the description thereof is omitted. As shown in FIG. 10, in the present embodiment, the recesses 5 can be disposed at the first side wall faces 15 and the second side wall faces 16 of the crown block 30. On the crown block 30, a relatively high ground contact pressure can act during straight running. In a case where the recess 5 is disposed at such a crown block 30, straight running can be particularly stabilized.

Figure 11:
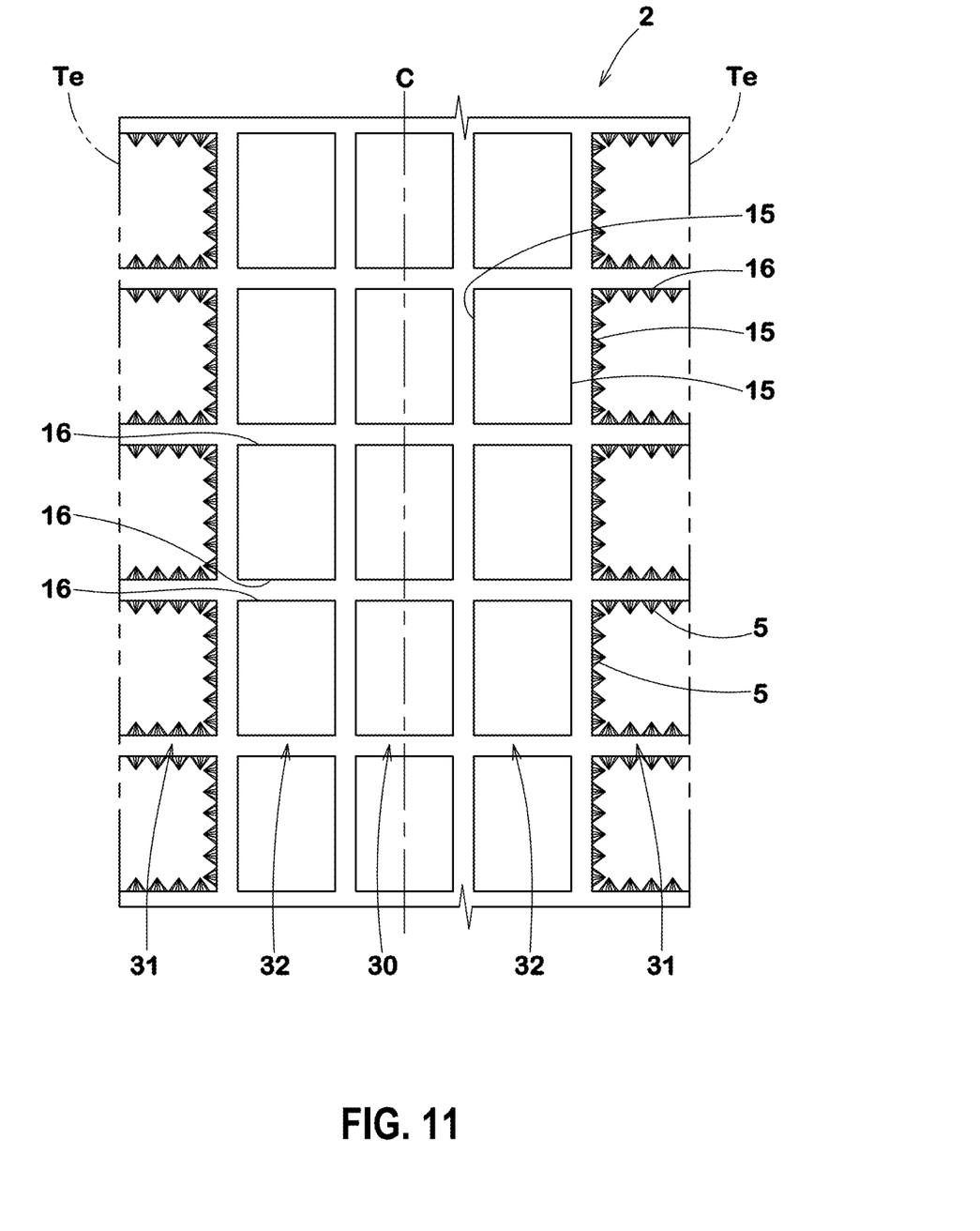
FIG. 11 is a plan view of a tread portion according to still another embodiment.

FIG. 11 is a plan view illustrating development of the tread portion 2 of another embodiment between the tread ends Te. The same components as shown in FIG. 8 are denoted by the same reference characters, and the description thereof is omitted. As shown in FIG. 10, in the present embodiment, the recesses 5 can be disposed at the first side wall faces 15 and the second side wall faces 16 of the shoulder blocks 31. On the shoulder block 31, a relatively high ground contact pressure can act during cornering. In a case where the recess 5 is disposed at such a shoulder block 31, cornering can be particularly stabilized.

Figure 12:
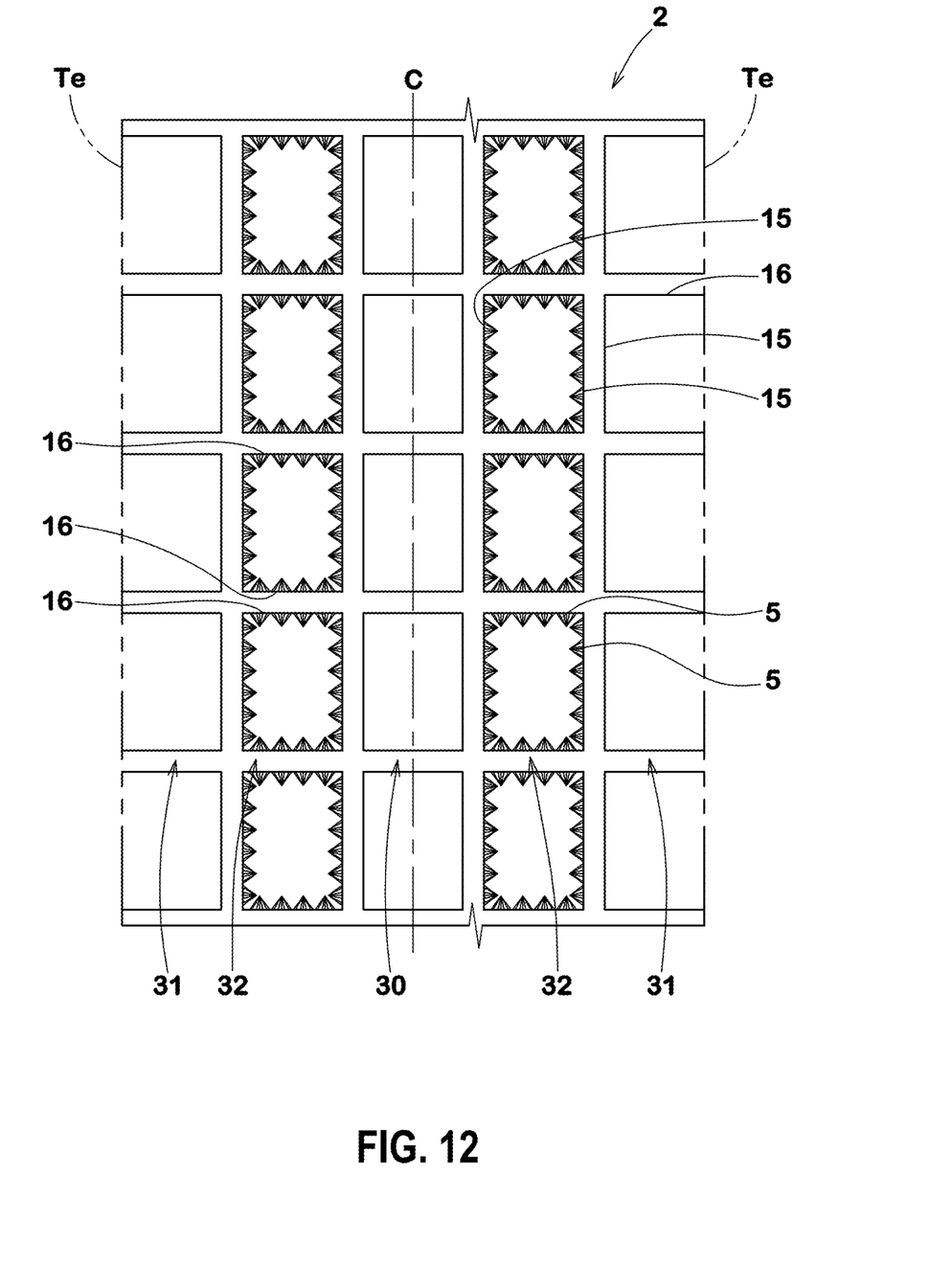
FIG. 12 is a plan view of a tread portion according to still another embodiment.

FIG. 12 is a plan view illustrating development of the tread portion 2 of another embodiment between the tread ends Te. The same components as shown in FIG. 8 are denoted by the same reference characters, and the description thereof is omitted. As shown in FIG. 10, in the present embodiment, the recesses 5 can be disposed at the first side wall faces 15 and the second side wall faces 16 of the middle blocks 32. On the middle block 32, a relatively high ground contact pressure can act from straight running to cornering. In a case where the recess 5 is disposed at such a middle block 32, straight running and cornering can be particularly stabilized in a relatively well-balanced manner.

The recess 5 of the present embodiment may not necessarily be disposed in this manner. For example, the recesses 5 may be disposed at the first side wall faces 15 and the second side wall faces 16 of the crown block 30 and the shoulder blocks 31. Furthermore, the recesses 5 may be disposed at the first side wall faces 15 and the second side wall faces 16 of each of the blocks 30 to 32. The recesses 5 may be disposed at the middle blocks 32 or the shoulder blocks 31 that are disposed on the outer sides of a vehicle when the tire 1 is mounted to the vehicle. Moreover, the recesses 5 may be disposed at the middle blocks 32 or the shoulder blocks 31 that are disposed on the inner side of a vehicle when the tire 1 is mounted to the vehicle.

Embodiments of the disclosed subject matter are not limited to the illustrated embodiments, and various modifications can be devised to implement some or all aspects of the present disclosure.

EXAMPLES

Pneumatic tires having the basic tread pattern shown in FIG. 8 and a size of 205/55R16 were produced as test tires based on the specifications indicated in Table 1. Snow road performance on a packed-snow road and steering stability on a dry road were tested for each test tire. Specifications common to the test tires and a test method are as follows.
Rim: 16×6.5
Tire internal pressure: 200 kPa
Test vehicle: four-wheel-drive vehicle having an engine displacement of 2000 cc
Positions at which the test tires were mounted: all wheels
<Snow Road Performance on Packed-Snow Road and Steering Stability on Dry Road>

A driver made sensory evaluation for steering stability including steering wheel operability during driving and braking when the test vehicle was caused to run on a packed-snow road and a dry asphalt road. The results are indicated as scores with the score of a comparative example being 100. The greater the value is, the more excellent each performance is.

The test results are indicated in Table 1.

In Table 1, "La" represents a length of each of paired second edges.
$\theta_1$: 0°
$\theta_2$: 0°

Table 1

|  | Comp. Ex. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Presence or absence of second edge subsidiary portion | absent | present | present | present | present | present | present | present | present |
| d1/Ha | 0.3 | 0.3 | 0.3 | 0.3 | 0.3 | 0.3 | 0.3 | 0.2 | 0.5 |
| La (mm) | 3 | 3 | 3 | 3 | 2 | 4 | 5 | 3 | 3 |
| w1/Wa | — | 0.25 | 0.20 | 0.30 | 0.25 | 0.25 | 0.25 | 0.25 | 0.25 |
| Snow road performance [Score: the greater the value is, the better the performance is] | 100 | 108 | 110 | 113 | 105 | 110 | 113 | 105 | 108 |
| Steering stability [Score: the greater the value is, the better the performance is] | 100 | 100 | 100 | 100 | 100 | 98 | 95 | 103 | 100 |

According to the test results, it was confirmed that the tires of the examples had excellent snow road performance. Furthermore, it was confirmed that deterioration of steering stability on a dry road was inhibited in the tires of the examples.

What is claimed is:

1. A tire comprising:
a tread portion,
wherein the tread portion includes at least one block,
wherein the at least one block includes:
  a tread, and
  a side wall face extending inwardly from the tread in a tire radial direction,
wherein the at least one block has a recess,
wherein the recess includes a first opening on a tread side and a second opening on a side wall face side of the at least one block,
wherein the first opening includes a pair of first edges extending from a first vertex to the side wall face so as to form a V-shaped edge on the tread,
wherein the second opening includes a pair of second edges that extend from a second vertex on the side wall face, and that are connected to the pair of first edges at respective intersection points, and
wherein each of the second edges includes a second edge body extending on a straight line from the second vertex toward a corresponding one of the intersection points, and a second edge subsidiary portion that is bent so as to widen the second opening,
wherein each of the second edge subsidiary portions, which are bent, extends horizontally and vertically relative to a plane of the tread, and
wherein the recess includes a plurality of face surfaces, each of the face surfaces tapering from thick to thin from the side wall face to the first vertex.

2. The tire according to claim 1, wherein an angle, of a line segment connecting the first vertex and the second vertex to each other, relative to the tread, is 30 to 50°.

3. The tire according to claim 1, wherein the second edge subsidiary portion includes a first portion extending at an angle of not greater than 10° relative to the tread.

4. The tire according to claim 3, wherein a width of the first portion is 0.20 to 0.30 times a maximum width of the recess.

5. The tire according to claim 3, wherein the angle of the first portion of the second edge subsidiary portion relative to the tread is 0°.

6. The tire according to claim 1, wherein a maximum depth of the recess is 0.2 to 0.5 times a block height.

7. The tire according to claim 1, wherein the side wall face extends in a tire axial direction.

8. The tire according to claim 1, further comprising: a pair of the side wall faces, and a plurality of recesses associated with each of the side wall faces, wherein the side wall faces are separated from each other via the tread so as to be located on opposite sides of the at least one block, the plurality of recesses per side wall face are separated from each other, and the plurality of recesses on opposite sides of the at least one block are aligned with each other across the at least one block.

9. The tire according to claim 1, wherein a length of at least one of the pair of first edges and the pair of second edges is 2 to 4 mm.

10. The tire according to claim 1, wherein the recess includes: a pair of inclined faces as two of the face surfaces, each of the inclined surfaces extending from the first vertex and either the second vertex, or one of the intersection points, and a grooved portion as two of the face surfaces different from the face surfaces forming the pair of inclined faces, the grooved portion being associated with the second edge subsidiary portion.

11. The tire according to claim 10, wherein the grooved portion is between the inclined faces and the tread.

12. The tire according to claim 10, wherein the grooved portion extends from the first vertex to the second edge subsidiary portion.

13. The tire according to claim 1, wherein
in an overhead plan view of the tire the face surfaces have non-uniform thicknesses at the side face, and
each of the face surfaces has a length greater than the thickness thereof at the side face.

14. The tire according to claim 1, wherein the side wall having the second opening is on a side wall of the at least one block that extends in the tire circumferential direction.

15. The tire according to claim 1,
wherein the at least one block includes a first block and a second block, the first and second block being separated by a groove,
wherein the recess is in each of the first block and the second block,
wherein the recess in the first block faces the recess in the second block, and
wherein recess in the first block is aligned with the recess in the second block in a tire circumferential direction.

16. A tire treading comprising: at least one block, wherein the at least one block includes: a tread, and a plurality of side wall faces extending inwardly from the tread in a tire radial direction, wherein the at least one block has a plurality of recesses, wherein each of the recesses includes a first opening on a tread side and a second opening on a side wall face side, wherein the first opening includes a pair of first edges extending from a first vertex to the side wall face so as to form a V-shaped edge on the tread, wherein the second opening includes a pair of second edges that extend from a second vertex on the side wall face, and that are connected to the pair of first edges at respective intersection points, wherein each of the second edges includes a second edge body extending on a straight line from the second vertex to a corresponding one of the intersection points, and a second edge subsidiary portion between the second vertex and the corresponding one of the intersection points that is bent so as to widen the second opening at the side wall face, and wherein each of the second edge bodies includes a pair of second edge body portions on opposite sides of and directly connected to the second edge subsidiary portion, a first of the second edge body portions being directly connected to the corresponding one of the intersection points and a second of the second edge body portions being directly connected to the second vertex.

17. The tire treading according to claim 16, wherein
the plurality of side wall faces are separated from each other via the tread so as to be located on opposite sides of the at least one block, and
respective sets of the plurality of recesses are disposed at each of the side wall faces separated from each other.

18. The tire treading according to claim 16, wherein each of the plurality of recesses includes:
a pair of inclined faces each passing through the first vertex, the second vertex, and one of the intersection points, the pair of inclined faces respectively corresponding to the pair of second edge body portions on the opposite sides of the second edge subsidiary portion, and
a pair of grooved portions respectively corresponding to the second edge subsidiary portions,
wherein each of the second edge subsidiary portions extends horizontally and vertically relative to a plane of the tread.

19. The tire treading according to claim 18, wherein each of the grooved portions has a width that increases from the first vertex toward a corresponding one of the second edges both horizontally and vertically.

20. The tire treading according to claim 18, wherein each of the grooved portions extends from the first vertex to the second edge subsidiary portion.

* * * * *